US012028540B2

(12) United States Patent
Santhar et al.

(10) Patent No.: US 12,028,540 B2
(45) Date of Patent: Jul. 2, 2024

(54) VIDEO SIZE REDUCTION BY RECONSTRUCTION

(71) Applicant: INTERNATIONAL BUSINESS MACHINES CORPORATION, Armonk, NY (US)

(72) Inventors: Sathya Santhar, Ramapuram (IN); Sarbajit K. Rakshit, Kolkata (IN); Sridevi Kannan, Chennai (IN); Samuel Mathew Jawaharlal, Chennai (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/844,152

(22) Filed: Jun. 20, 2022

(65) Prior Publication Data

US 2023/0412825 A1    Dec. 21, 2023

(51) Int. Cl.
*H04N 19/42*  (2014.01)
*H04N 19/167*  (2014.01)
*H04N 19/503*  (2014.01)
*H04N 19/593*  (2014.01)
*H04N 19/90*  (2014.01)

(52) U.S. Cl.
CPC .......... *H04N 19/42* (2014.11); *H04N 19/167* (2014.11); *H04N 19/503* (2014.11); *H04N 19/593* (2014.11); *H04N 19/90* (2014.11)

(58) Field of Classification Search
CPC .... H04N 19/593; H04N 19/90; H04N 19/503; H04N 19/167; H04N 19/42
See application file for complete search history.

(56) References Cited

U.S. PATENT DOCUMENTS

| | | | |
|---|---|---|---|
| 10,972,809 B1* | 4/2021 | Key | H04N 21/23439 |
| 2018/0137389 A1 | 5/2018 | Mathieu et al. | |
| 2019/0377955 A1 | 12/2019 | Swaminathan et al. | |
| 2020/0244969 A1 | 7/2020 | Bhorkar | |
| 2021/0150769 A1 | 5/2021 | Babaheidarian | |
| 2021/0168395 A1 | 6/2021 | Cricri et al. | |
| 2022/0108434 A1 | 4/2022 | Donahue et al. | |

(Continued)

OTHER PUBLICATIONS

Notification of Transmittal of the International Search Report and the Written Opinion of the International Searching Authority, or the Declaration, International Application No. PCT/IB2023/054745, Jun. 29, 2023, 12 pgs.

(Continued)

*Primary Examiner* — On S Mung
(74) *Attorney, Agent, or Firm* — Jared C. Chaney

(57) ABSTRACT

A video file is detected by a computer system. The video file that is to be provided to one or more client devices. The video file contains a video stream that includes a plurality of video images. A first video image of the plurality of video images is reconstructed based on a first machine learning technique. The first machine learning technique is based on one or more video images that occur temporally before the first video image in the video stream. A reconstruction status of the first video image of the plurality of video images is identified based on the video file and based on a second machine learning technique. An altered video file is generated in response to the reconstruction status and based on the video file.

20 Claims, 7 Drawing Sheets

(56) References Cited

U.S. PATENT DOCUMENTS

2023/0005203 A1\* 1/2023 Shi ........................ G06T 13/40

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.
Mentzer et al., "Neural Video Compression using GANs for Detail Synthesis and Propagation," arXiv:2107.12038v2 [eess.IV], Nov. 23, 2021, 19 pages.
Liu et al., "Deep Learning in Latent Space for Video Prediction and Compression," 2021 IEEE/CVF Conference on Computer Vision and Pattern Recognition (CVPR), 2021, 10 pages, https://ieeexplore.ieee.org/document/9578733.
Hosseini et al., "Inception-inspired LSTM for Next-frame Video Prediction," arXiv:1909.05622v2 [cs.CV] Apr. 24, 2020, 7 pages, https://arxiv.org/abs/1909.05622.
Kwon et al., "Predicting Future Frames using Retrospective Cycle GAN," ResearchGate, 2019 IEEE/CVF Conference on Computer Vision and Pattern Recognition (CVPR), Jun. 2019, 11 pages, https://www.researchgate.net/publication/332978506_Predicting_Future_Frames_Using_Retrospective_Cycle_GAN.
Sulun, "Deep Learned Frame Prediction for Video Compression," arXiv:1811.10946v1 [eess.IV] Nov. 27, 2018, 71 pages, https://arxiv.org/abs/1811.10946.
Galteri et al., "Fast Video Quality Enhancement using GANs," ACM, MM '19, Oct. 21-25, 2019, Nice, France, 3 pages, https://doi.org/10.1145/3343031.3350592.

\* cited by examiner

VIDEO SIZE REDUCTION BY RECONSTRUCTION

BACKGROUND

The present disclosure relates to computer file sizes, and more specifically, to reducing the file size of video files.

Computers may operate on data to send information to other computers, such as through a computer network ("network"). The ability to send and share information may be influenced by the resources that are available to the computers. For example, network functionality and availability may be influenced by the number of computing devices that are trying to use the network and/or the number or size of files that are being exchanged through the network.

SUMMARY

According to embodiments, disclosed are a method, system, and computer program product.

A video file is detected by a computer system. The video file that is to be provided to one or more client devices. The video file contains a video stream that includes a plurality of video images. A first video image of the plurality of video images is reconstructed based on a first machine learning technique. The first machine learning technique is based on one or more video images that occur temporally before the first video image in the video stream. A reconstruction status of the first video image of the plurality of video images is identified based on the video file and based on a second machine learning technique. An altered video file is generated in response to the reconstruction status and based on the video file.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
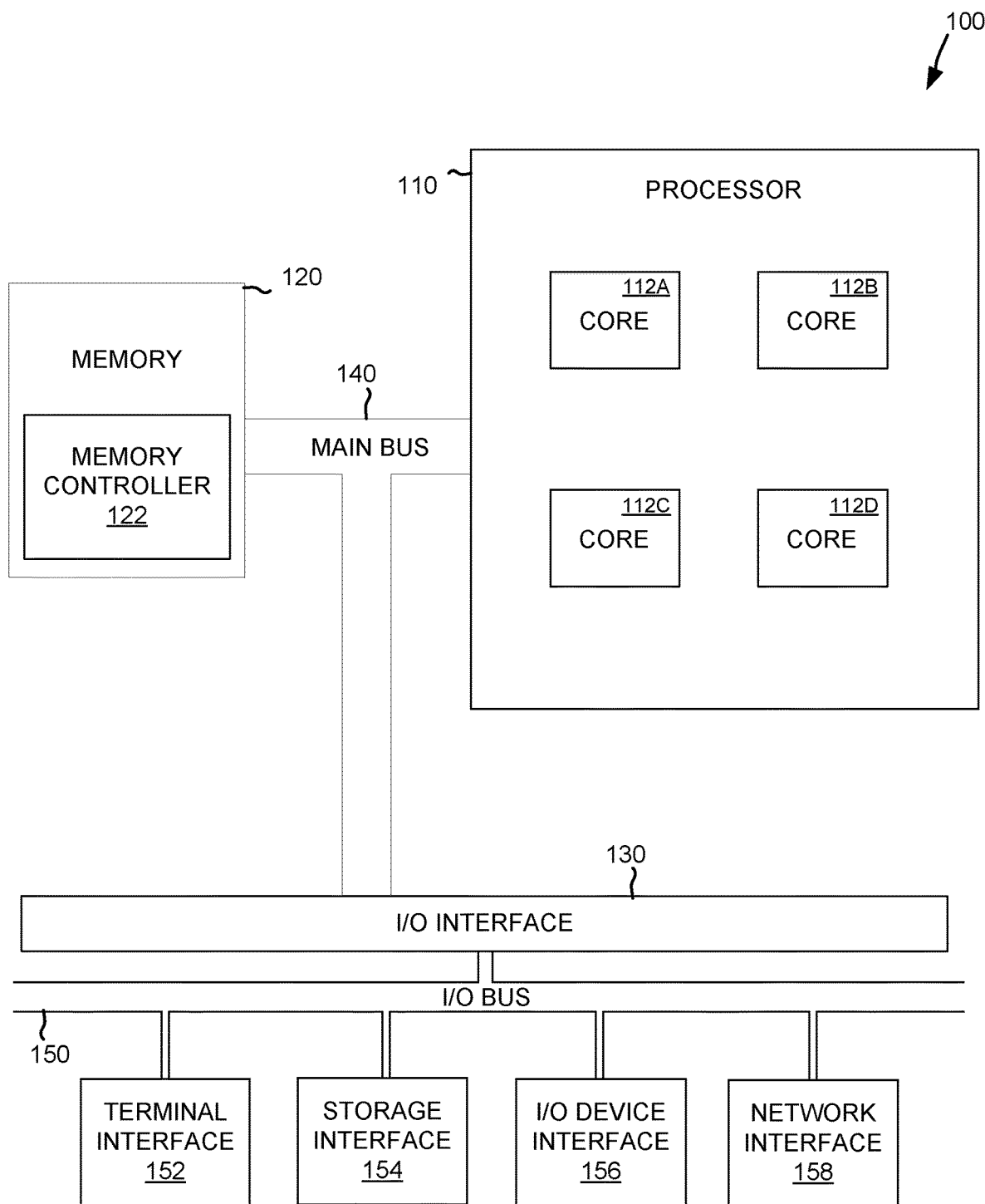
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer file sizes; more particular aspects relate to reducing the file size of video files. While the present disclosure is not necessarily limited to such applications, various aspects of the disclosure may be appreciated through a discussion of various examples using this context.

A majority of information consumed today is in a video format and there is a technical need to generate and provide the video files with reduced size.

Video compression is one way of reducing the total number of bits needed to represent a given image or video sequence in a video file ("video"). A video sequence may be a series of frames and/or images. The frames, when played or provided to a user in sequence, may depict various scenes. Video compression may be performed by a program with a specific algorithm or formula for determining the best way to shrink or reduce the file size of the video file. Alternatively, video compression may be described as the process of encoding a video file in such a way that the video file consumes less space than the original file. There may be technical benefits or usefulness to reducing the size. For example, it may be easier to transmit a smaller file over a network, such as the Internet.

Video compression and decompression tools (alternatively, a CODEC or codec) may refer to various types of compressions techniques, schemes, algorithms, or computer operations that reduce the size of video file formats by eliminating redundant and non-functional data from the original video file. Video compression (alternatively, encoding) may have certain drawbacks. For instance, the process of compressing the frames, may yield a potentially change in the video, sometimes even changing the video content. Further, compression can be a lossy process that throws away information related to the video (e.g., certain pixels or depicted features and characteristics). Upon decompression for playback, an approximation of the original is created. For lossy codecs, the more compression applied, the more data is thrown out and the worse the approximation looks versus the original.

There are two reasons why video encoding is important, and the drawbacks of videos are related to these reasons. The first, is video compression may make it easier to transmit video over the Internet. This is because compression reduces the bandwidth required, while also retaining as much of the original video quality as possible to provide a quality experience. Without compression, raw video content would exclude many from being able to stream content over the Internet due to normal connection speeds not providing adequate bandwidth. One aspect of video file size relates to the moment to moment size or quality of a video (e.g., bit rate). The bit rate of a video file may dictate the amount of data per second that is required for playback. For streaming, the video file size may dictate if a viewer can easily watch the content or if they will be stuck buffering the video. The second reason for video encoding may include compatibility. Sometimes content may already be compressed to an adequate size but still needs to be encoded for compatibility, (e.g., transcoding). Being compatible can relate to certain services or programs, which require certain encoding specifications. Transcoding can also factor into compatibility for playback with audiences. For example, video compression is a part of recording and saving security camera footage. A security camera may compress the raw files into a smaller format. The technical benefit being that more footage may be stored, or footage that is of a higher quality to identify important information from the footage. Resultantly, a better way to reduce file size may allow a party to store more video data.

Machine learning ("ML") may be another way of reducing the total number of bits needed to represent a given image or video sequence in a video file ("video").

Next-frame prediction, that is, predicting what happens next in the form of an image or a few images, is an emerging field of machine learning (e.g., computer vision and deep learning). This prediction is built on the understanding of the information in the historical image(s) that have occurred previously. Next-frame prediction may refer to starting from continuous, unlabeled video frames and constructing a neural network that can accurately generate subsequent frames. The input of the network is the previous frame(s), and the output is a prediction of the next frame(s). Further, video prediction is the task of predicting future frames in a video stream or video file given past video frames of the same video stream or video file, respectively. Defined as a self-supervised machine learning task, video prediction represents a suitable framework for representation learning, as it demonstrates potential capabilities for extracting meaningful representations of the underlying patterns in natural videos.

Generative adversarial networks (GANs) may be a machine learning approach towards generative modelling using deep learning methods, such as convolutional neural networks. GAN may be a machine learning technique that is applicable to the tasks of new video generation and next frame prediction in a video. GANs may be a way of training a generative model by framing the problem as a supervised learning problem with two sub-models: the generator model that is trained to generate new examples of potential next frames, and the discriminator model that tries to classify examples as either real (from the domain) or fake (generated). The two models are trained together in a zero-sum game, adversarial, until the discriminator model is fooled about half the time, meaning the generator model is generating plausible examples.

Next-frame prediction can be taken as a spatiotemporal problem. Given a sequence of images in continuous time steps, predicting the next frame is performed by time sequence learning. The next frame prediction architecture can be categorized in to two types: sequence-to-one architecture; and, sequence-to-many architecture. In a sequence-to-one architecture, the machine learning may be configured to predict the immediate next frame using the sequence of previous frames. In a sequence-to-many architecture, the machine learning may be configured to predict the next few frame sequences using the sequence of previous frames.

Sharing high-quality videos between teams and clients can be frustrating since video files size are bulky at the best of times. Compressing videos may only solve this problem with other drawbacks. As the resolution of digitally recorded and streamed videos keeps growing, there is an increasing demand for video compression algorithms that enable fast transmission of videos without loss in video quality. While current video codecs can encode video at low bitrates, this usually results in unpleasant compression artifacts. At extremely low bit-rates, standard video coding schemes suffer from unpleasant reconstruction artifacts such as blocking, ringing, etc.

The application of deep neural networks to develop learned video compression algorithms as discussed produces promising results but with other drawbacks. For instance, due to the use of distortion metrics such as multiscale structural similarity (MS-SSIM) and mean squared error (MSE), the reconstruction of ML appears to be blurry, overly smooth, or otherwise distorted. Existing learned neural approaches to video compression have achieved reasonable success on reducing the bit-rate for efficient transmission and reduce the impact of artifacts to an extent. However, they still tend to produce blurred results under extreme compression, or while using extended amounts of images (e.g., the dozens of images that are in a video file). Further, while a GAN used on a single image for various reconstruction may work in limited scenarios, this does not work in relation to video files. Specifically, GAN may produce a satisfactory reproduction for a first frame of video, but a second frame of video may produce distorted results. Certain content (e.g., specific lighting, particular individuals, actions) may be distorted blocky, smeared, or otherwise unrecognizable. Consequently, currently ML, while showing potential for still images or one-off scenarios, are generally considered unusable in video scenarios.

Reconstruction Video Reduction ("RVR") may overcome the various problems and limitations with providing videos as compared to other techniques of video manipulation. Specifically, the RVR may be configured to generate videos of reduced size to client devices. The reduced file sizes may be of a benefit to various computer systems. For example, a technical advantage of the RVR is the ability to provide high quality videos with reduced need for network bandwidth and/or lower storage costs. In another example, an RVR may be ability to provide access or distribution of an increasing number of videos while maintaining the video quality as compared to other techniques of video storage and distribution. Further, the RVR may operate by providing video files that do not have visible artifacts. Specifically, utilizing techniques of RVR, a video may be stored and transferred to other devices with no ringing, blocking, smearing, pixelating, or other distortions. In some embodiments, utilizing RVR may allow for a relatively small file size while also receiving a video stream that is not compressed at all. Moreover, the RVR may operate by providing video of high quality to a device that can not easily store or receive a video. For example, a smartphone may have two network connections such as a cellular connection and a Wi-Fi connection. In another example, a smartphone may not have any network connectivity other than a cellular connection. Utilizing other techniques, the device may not be able to receive or capture a relatively high quality video while on a cellular connection. Utilizing RVR, a smartphone may be configured to receive a relatively high-quality video file over a cellular connection.

The RVR may be configured to detect a video file that is to be provided to one or more client devices. For example, the RVR may operate as part of a video distribution or other relevant Internet service provider ("ISP"). In some embodiments, the RVR may operate on an end user client device or other computer system. The RVR may operate by leveraging machine learning ("ML") techniques to identify video images that may be able to be reconstructed ("reconstructable") by other ML techniques. The reconstructable video images may be images that have no blurring, no smearing, no artifacts, or other distortions. The RVR may further be configured to selectively reduce the size of the video stream in the video file by generating an altered video file. The altered video file may be of a reduced size compared to the video file (e.g., an altered video file that is eighty percent of the size of an original video file, or an adjusted video file that is forty-five percent of the size of an original video file).

The RVR may be configured to operate on video images of a video stream. These video images may be referred to as video frames. The video frames may be compressed using a particular video codec (e.g., MPEG, MP4).

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively, 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases
   automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
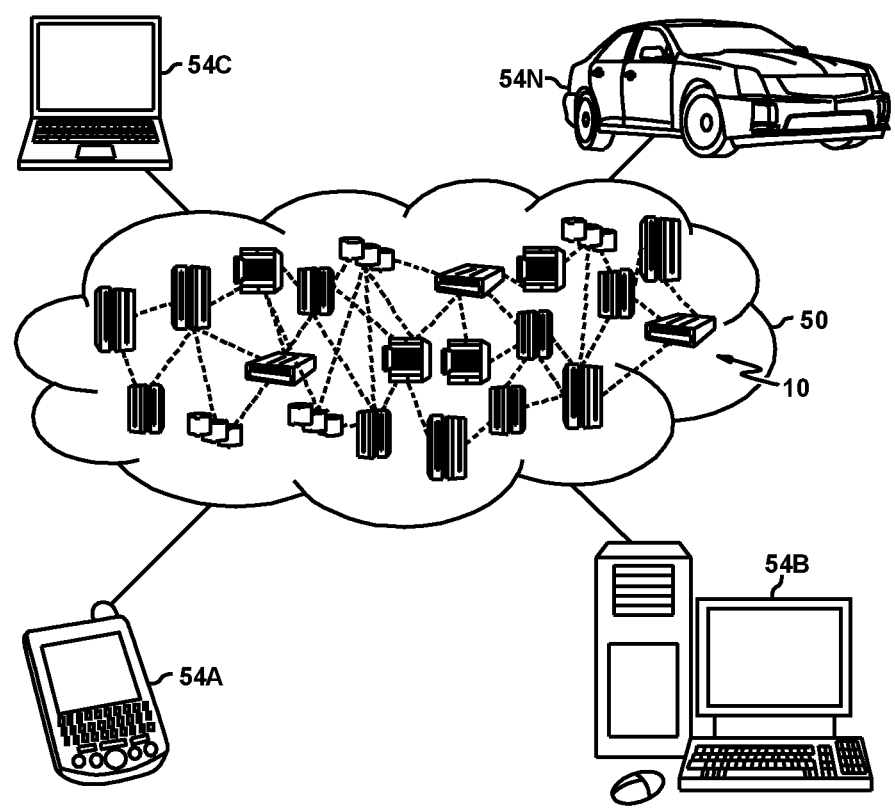
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
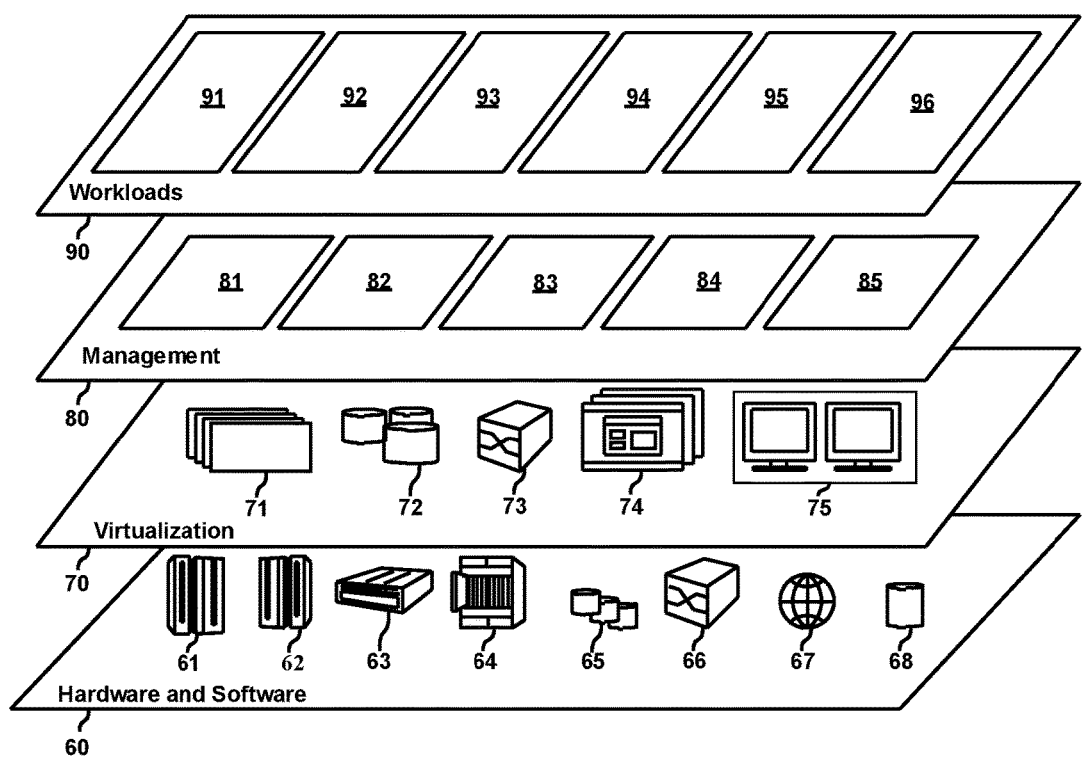
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and RVSR 96.

Figure 4:
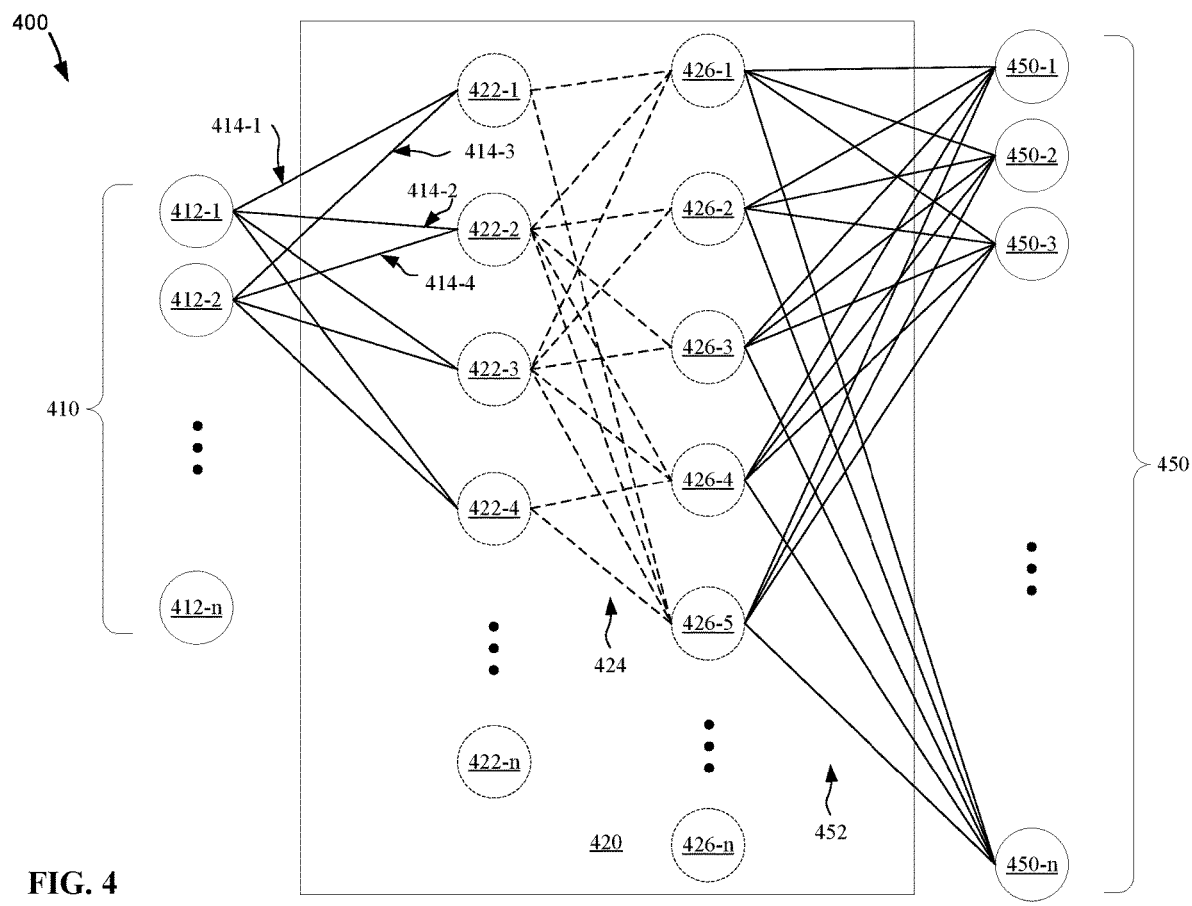
FIG. 4 depicts an example neural network representative of one or more artificial neural networks, consistent with some embodiments of the present disclosure.

FIG. 4 depicts an example neural network (alternatively, "network") 400 representative of one or more artificial neural networks, consistent with some embodiments of the present disclosure. The neural network 400 is made up of a plurality of layers. The network 400 includes an input layer 410, a hidden section 420, and an output layer 450. Though network 400 depicts a feed-forward neural network, it should be appreciated that other neural networks layouts may also be contemplated, such as a recurrent neural network layout (not depicted). In some embodiments, the network 400 may be a design-and-run neural network and the layout depicted may be created by a computer programmer. In some embodiments, the network 400 may be a design-by-run neural network, and the layout depicted may be generated by the input of data and by the process of analyzing that data according to one or more defined heuristics. The network 400 may operate in a forward propagation by receiving an input and outputting a result of the input. The network 400 may adjust the values of various components of the neural network by a backward propagation (back propagation).

The input layer 410 includes a series of input neurons 412-1, 412-2, up to 412-$n$ (collectively, 412) and a series of input connections 414-1, 414-2, 414-3, 414-4, etc. (collectively, 414). The input layer 410 represents the input from data that the neural network is supposed to analyze data (e.g., images, sounds, text, hardware sensor information). Each input neuron 412 may represent a subset of the input data.

For example, input neuron 412-1 may be the first pixel of a picture, input neuron 412-2 may be the second pixel of the picture, etc. The number of input neurons 412 may correspond to the size of the input. For example, when neural network 400 is designed to analyze images that are 256 pixels by 256 pixels, the neural network layout may include a series of 65,536 input neurons. The number of input neurons 412 may correspond to the type of input. For example, when the input is a color image that is 256 pixels by 256 pixels, the neural network layout may include a series of 196,608 input neurons (65,536 input neurons for the red values of each pixel, 65,536 input neurons for the green values of each pixel, and 65,536 input neurons for the blue values of each pixel). The type of input neurons 412 may correspond to the type of input. In a first example, a neural network may be designed to analyze images that are black and white, and each of the input neurons may be a decimal value between 0.00001 and 1 representing the grayscale shades of the pixel (where 0.00001 represents a pixel that is completely white and where 1 represents a pixel that is completely black).

In a second example, a neural network may be designed to analyze images that are color, and each of the input neurons may be a three-dimensional vector to represent the color values of a given pixel of the input images (where the first component of the vector is a red whole-number value between 0 and 255, the second component of the vector is a green whole-number value between 0 and 255, and the third component of the vector is a blue whole-number value between 0 and 255).

The input connections 414 represent the output of the input neurons 412 to the hidden section 420. Each of the input connections 414 varies depending on the value of each input neuron 412 and based upon a plurality of weights (not depicted). For example, the first input connection 414-1 has a value that is provided to the hidden section 420 based on the input neuron 412-1 and a first weight. Continuing the example, the second input connection 414-2 has a value that is provided to the hidden section 420 based on the input neuron 412-1 and a second weight. Further continuing the example, the third input connection 414-3 based on the input neuron 412-2 and a third weight, etc. Alternatively stated, the input connections 414-1 and 414-2 share the same output component of input neuron 412-1 and the input connections 414-3 and 414-4 share the same output component of input neuron 412-2; all four input connections 414-1, 414-2, 414-3, and 414-4 may have output components of four different weights. Though the network neural 400 may have different weightings for each connection 414, some embodiments may contemplate weights that are similar. In some embodiments, each of the values of the input neurons 412 and the connections 414 may necessarily be stored in memory.

The hidden section 420 includes one or more layers that receive inputs and produce outputs. The hidden section 420 includes a first hidden layer of calculation neurons 422-1, 422-2, 422-3, 422-4, up to 422-n (collectively, 422); a second hidden layer of calculation neurons 426-1, 426-2, 426-3, 426-4, 426-5, up to 426-n (collectively 426); and a series of hidden connections 424 coupling the first hidden layer and the second hidden layer. It should be appreciated that neural network 400 only depicts one of many neural networks capable of performing ML operations consistent with some embodiments of the disclosure. Consequently, the hidden section 420 may be configured with more or less hidden layers (e.g., one hidden layer, seven hidden layers, twelve hidden layers, etc.)—two hidden layers are depicted for example purposes.

The first hidden layer includes the calculation neurons 422-1, 422-2, 422-3, 422-4, up to 422-n. Each calculation neuron of the first hidden layer may receive as input one or more of the connections 414. For example, calculation neuron 422-1 receives input connection 414-1 and input connection 414-2. Each calculation neuron of the first hidden layer also provides an output. The output is represented by the dotted lines of hidden connections 424 flowing out of the first hidden. Each of the calculation neurons 422 performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, 0.671, etc.) and calculating a single non-binary output (e.g., a number between 0 and 1, a number between −0.5 and 0.5, etc.). Various functions may be performed to calculate the activation function (e.g., a sigmoid neurons or other logistic functions, tanh neurons, softplus functions, softmax functions, rectified linear units, etc.). In some embodiments, each of the calculation neurons 422 also contains a bias (not depicted). The bias may be used to decide the likelihood or valuation of a given activation function. In some embodiments, each of the values of the biases for each of the calculation neurons must necessarily be stored in memory.

The neural network 400 may include the use of a sigmoid neuron for the activation function of calculation neuron 422-1. An equation (Equation 1, stated below) may represent the activation function of calculation neuron 412-1 as f(neuron). The logic of calculation neuron 422-1 may be the summation of each of the input connections that feed into calculation neuron 422-1 (i.e., input connection 414-1 and input connection 414-3) which are represented in Equation 1 as j. For each j the weight w is multiplied by the value x of the given connected input neuron 412. The bias of the calculation neuron 422-1 is represented as b. Once each input connection j is summed the bias b is subtracted. Finalizing the operations of this example as follows: given a larger positive number of results from the summation and bias in activation f(neuron), the output of calculation neuron 422-1 approaches approximately 1; given a larger negative number of results from the summation and bias in activation f(neuron), the output of calculation neuron 422-1 approaches approximately 0; and given a number somewhere in between a larger positive number and a larger negative number of results from the summation and bias in activation f(neuron), the output varies slightly as the weights and biases vary slightly.

$$f(\text{neuron}) = \frac{1}{1 + \exp\left(-\sum_j w_j x_j - b\right)} \qquad \text{Equation 1}$$

The second hidden layer includes the calculation neurons 426-1, 426-2, 426-3, 426-4, 426-5, up to 426-n. In some embodiments, the calculation neurons 426 of the second hidden layer may operate similarly to the calculation neurons 422 first hidden layer. For example, the calculation neurons 426-1 to 426-n may each operate with a similar activation function as the calculation neurons 422-1 to 422-*n*. In some embodiments, the calculation neurons 426 of the second hidden layer may operate differently to the calculation neurons 422 of the first hidden layer. For example, the calculation neurons 426-1 to 426-*n* may have a first activation function, and the calculation neurons 422-1 to 422-*n* may have a second activation function.

Similarly, the connectivity to, from, and between the various layers of the hidden section 420 may also vary. For example, the input connections 414 may be fully connected to the first hidden layer and hidden connections 424 may be fully connected from the first hidden layer to the second hidden layer 426. In some embodiments, fully connected may mean that each neuron of a given layer may be connected to all the neurons of a previous layer. In some embodiments, fully connected may mean that each neuron of a given layer may function completely independently and may not share any connections. In a second example, the input connections 414 may not be fully connected to the first hidden layer and the hidden connections 424 may not be fully connected from the first hidden layer to the second hidden layer 426.

Further, the parameters to, from, and between the various layers of the hidden section 420 may also vary. In some embodiments, the parameters may include the weights and the biases. In some embodiments, there may be more or less parameters than the weights and biases. For purposes of example, neural network 400 may be in the form of a convolutional neural network or convolution network. The convolutional neural network may include a sequence of heterogeneous layers (e.g., an input layer 410, a convolution layer 422, a pooling layer 426, and an output layer 450). In such a network, the input layer may hold the raw pixel data of an image in a 3-dimensional volume of width, height, and color. The convolutional layer of such a network may output from connections that are only local to the input layer to identify a feature in a small section of the image (e.g., an eyebrow from a face of a first subject in a picture depicting four subjects, a front fender of a vehicle in a picture depicting a truck, etc.). Given this example, the convolutional layer may include weights and biases and additional parameters (e.g., depth, stride, and padding). The pooling layers of such a network may take as input the output of the convolutional layers but perform a fixed function operation (e.g., an operation that does not consider any weight or bias). Also given this example, the pooling layer may not contain any convolutional parameters and may also not contain any weights or biases (e.g., performing a down-sampling operation).

The output layer 450 includes a series of output neurons 450-1, 450-2, 450-3, up-to 450-*n* (collectively, 450). The output layer 450 holds a result of the analyzation of the neural network 400. In some embodiments, the output layer 450 may be a categorization layer used to identify a feature of the input to the network 400. For example, the network 400 may be a classification network trained to identify Arabic numerals. In such an example, the network 400 may include ten output neurons 450 corresponding to which Arabic numeral the network has identified (e.g., output neuron 450-2 having a higher activation value than output neurons 450 may indicate the neural network determined an image contained the number '1'). In some embodiments, the output layer 450 may be a real-value target (e.g., trying to predict a result when an input is a previous set of results) and there may be only a singular output neuron (not depicted). The output layer 450 is fed from an output connection 452. The output connection 452 provides the activations from the hidden section 420. In some embodiments, the output connections 452 may include weights and the output neurons 450 may include biases.

Training the neural network depicted by neural network 400 may include performing back propagation. Back propagation is different from forward propagation. Forward propagation may include feeding of data into the input neurons 410; performing the calculations of the connections 414, 424, 452; and performing the calculations of the calculation neurons 422 and 426. The forward propagation may also be the layout of a given neural network (e.g., recurrence, number of layers, number of neurons in one or more layers, layers being fully connected or not to other layers, etc.). Back propagation may be used to determine an error of the parameters (e.g., the weights and the biases) in the network 400 by starting with the output neurons 450 and propagating the error backward through the various connections 452, 424, 414 and layers 426, 422, respectively.

Back propagation includes performing one or more algorithms based on one or more training data to reduce the difference between what a given neural network determines from an input and what the given neural network should determine from the input. The difference between a network determination and the correct determination may be called the objective function (alternatively, the cost function). When a given neural network is initially created and data is provided and calculated through a forward propagation the result or determination may be an incorrect determination.

For example, neural network 400 may be a classification network; may be provided with a 128 pixel by 250-pixel image input that contains the number '3'; and may determine that the number is most likely '9' and is second most likely '2' and is third most likely '3' (and so on with the other Arabic numerals). Continuing the example, performing a back propagation may alter the values of the weights of connections 414, 424, and 452; and may alter the values of the biases of the first layer of calculation neurons 422, the second layer of calculation neurons 426, and the output neurons 450. Further continuing the example, the performance of the back propagation may yield a future result that is a more accurate classification of the same 128 pixel by 250-pixel image input that contains the number '3' (e.g., more closely ranking '9', '2', then '3' in order of most likely to least likely, ranking '9', then '3', then '2' in order of most likely to least likely, ranking '3' the most likely number, etc.).

Equation 2 provides an example of the objective function ("example function") in the form of a quadratic cost function (e.g., mean squared error)—other functions may be selected, and the mean squared error is selected for example purposes. In Equation 2, all of the weights may be represented by w and biases may be represented by b of neural network 400. The network 400 is provided a given number of training inputs n in a subset (or entirety) of training data that have input values x. The network 400 may yield output a from x and should yield a desired output y(x) from x. Back propagation or training of the network 400 should be a reduction or minimization of the objective function 'O(w,b)' via alteration of the set of weights and biases. Successful training of network 400 should not only include the reduction of the difference between the answer a and the correct answers y(x) for the input values x, but given new input values (e.g., from additional training data, from validation data, etc.).

$$O(w, b) \equiv \frac{1}{2n} \sum_x \|y(x) - a\|^2 \qquad \text{Equation 2}$$

Many options may be utilized for back propagation algorithms in both the objective function (e.g., mean squared error, cross-entropy cost function, accuracy functions, confusion matrix, precision-recall curve, mean absolute error, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also, consequently, the alteration of the neural network 400 may be small in any given iteration. Back propagation algorithms may need to be repeated for many iterations to perform accurate learning as a result of the necessitated smallness of any given iteration.

For example, neural network 400 may have untrained weights and biases, and back propagation may involve the stochastic gradient descent to train the network over a subset of training inputs (e.g., a batch of 10 training inputs from the entirety of the training inputs). Continuing the example, network 400 may continue to be trained with a second subset of training inputs (e.g., a second batch of 10 training input from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would be needed to complete an epoch of the training data. Many epochs may be performed to continue training of a neural network. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained network, too many training epochs may yield overfitting in a trained network, etc.). Further, network 400 may be evaluated to quantify the performance of evaluating a dataset, such as by use of an evaluation metric (e.g., mean squared error, cross-entropy cost function, accuracy functions, confusion matrix, precision-recall curve, mean absolute error, etc.).

Figure 5A:
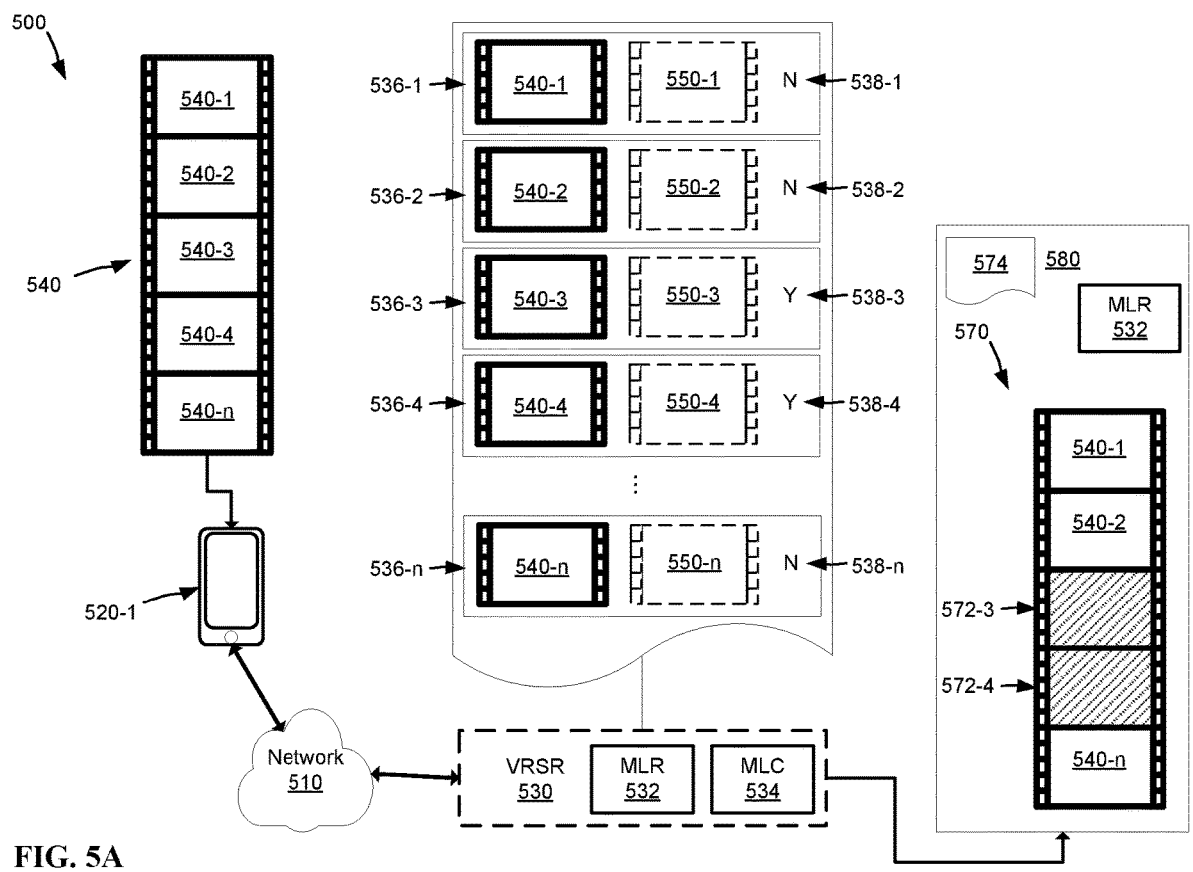
FIG. 5A depicts an example of a system configured to reduce the size of files based on reconstruction techniques, consistent with some embodiments of the disclosure.
Figure 5B:
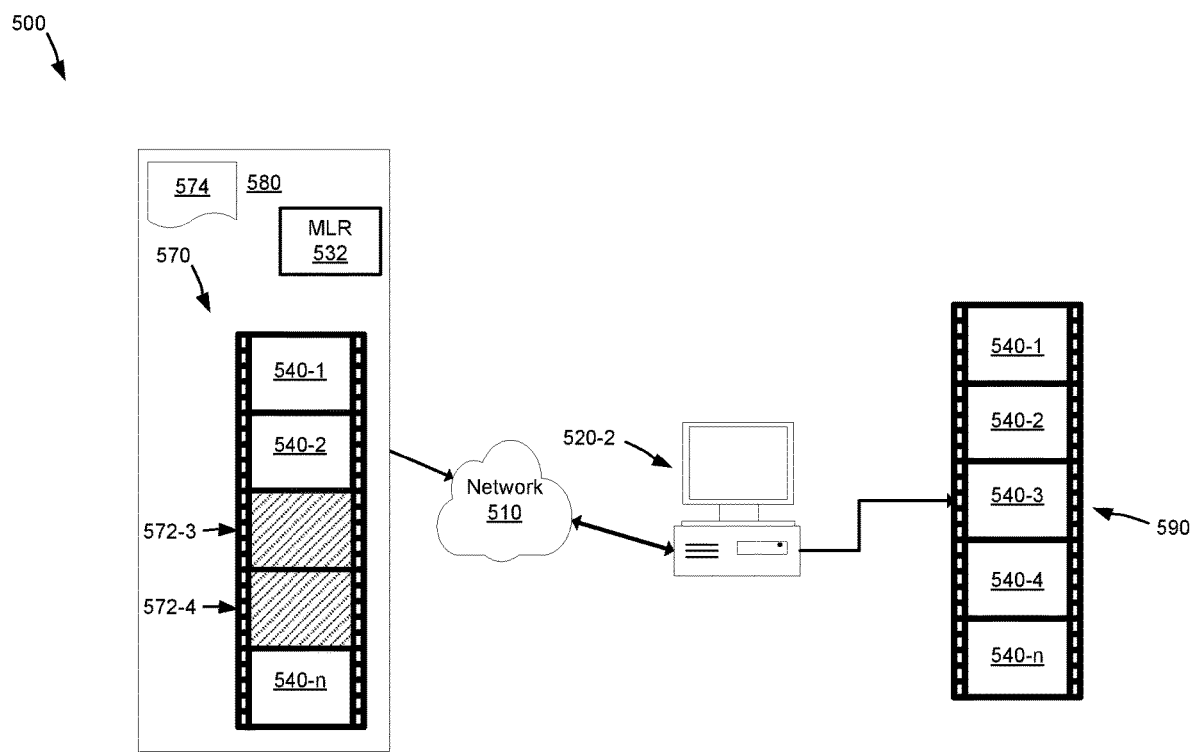
FIG. 5B depicts an example of a system configured to reconstruct a video file based on reconstruction techniques, consistent with some embodiments of the disclosure.

FIG. 5A and FIG. 5B (collectively FIG. 5) depict an example system 500 of manipulating video files, consistent with some embodiments of the disclosure. FIG. 5A depicts an example of system 500 configured to reduce the size of files based on reconstruction techniques, consistent with some embodiments of the disclosure. Specifically, system 500 may be configured to perform one or more reconstruction techniques to reduce the size of a video files that contain video streams.

System 500 may include the following: a network 510; a plurality of client devices 520-1, and 520-2 (collectively, client devices 520); and a VRSR 530. Network 510 can be implemented using any number of any suitable physical and/or logical communications topologies. The network 510 can include one or more private or public computing networks. For example, network 510 may comprise a private network (e.g., a network with a firewall that blocks non-authorized external access) that is associated with a particular function or workload (e.g., communication, streaming, hosting, sharing), or set of software or hardware clients. Alternatively, or additionally, network 510 may comprise a public network, such as the Internet. Consequently, network 510 may form part of a data unit network (e.g., packet-based)—for instance, a local-area network, a wide-area network, and/or a global network.

Network 510 can include one or more servers, networks, or databases, and can use one or more communication protocols to transfer data between other components of system 500. Furthermore, although illustrated in FIG. 5 as a single entity, in other examples, network 510 may comprise a plurality of networks, such as a combination of public and/or private networks. The communications network 510 can include a variety of types of physical communication channels or "links." The links can be wired, wireless, optical, and/or any other suitable media. In addition, the communications network 510 can include a variety of network hardware and software (not depicted) for performing routing, switching, and other functions, such as routers, switches, base stations, bridges, or any other equipment that may be useful to facilitate communicating data.

The client devices 520 may be computers configured to interact based on user input. Each client device 520 may be embodied as a computer system, such as an instance of computer system 100 of FIG. 1. Specifically, the client devices 520 may be computer systems that include one or more input/output subsystems, processors, and memory (not depicted in FIG. 5). For example, client device 520-1 may be a smartphone that includes a camera configured to capture video streams, and generate a video file, such as video file 540. In another example, the memory of the client devices 520 may be configured to store and receive various files, such as video files. Though system 500 may depict two client devices 520-1 and 520-2, some embodiments of the disclosure contemplate more or fewer client devices (e.g., dozens, hundreds). Two client devices 520 are depicted solely for purposes of explanation.

The VRSR 530 may be configured to analyze video files and to identify reconstructable images in the video files. Further, based on identifying reconstructable images, the VRSR 530 may be configured to reduce the size of video files. Specifically, the VRSR 530 may receive video files and may be configured to flag, tag, replace, reduce, compress, remove, or alter images and/or frames of video streams that are a part of video files. Stated another way, VRSR 530 may adjust video files by selectively compress one or more images of the video files while also leaving untouched or unaltered other video files, to reduce the size of the video files.

The VRSR 530 may be a combination of software and/or hardware that is configured to reduce the file size of video files. The VRSR 530 may operate as part of one or more of the client devices, such as a module or routine that is embedded into client device 520-1. The VRSR 530 may operate as a stand-alone computer system, such as an instance of computer 100. The VRSR 530 may operate as part of an abstracted computer, such as a part of cloud computing environment 50. The VRSR 530 may leverage a plurality of machine learning techniques. Specifically, the VRSR 530 may include the following: a first machine learning technique ("MLC") 532; and a second machine learning technique ("MLC") 534. VRSR 530 may be trained based on a plurality of video files of the same genre. For example, reconstruction of all videos that are animated videos may be of a first instance of VRSR 530. In a second example, reconstruction of all videos that are of sports videos may be of a second instance of VRSR 530. In a third example, reconstruction of all videos that are of a teleconference where presenters are speaking.

MLR 532 may be a neural network ("NN") or other relevant machine learning technique, such as an instance of network 400. MLR 532 may be configured to perform reconstruction of an image, such as next frame (alternatively, next image) prediction. MLR 532 may be a plurality of NNs that are configured to perform adversarial or contested operations on video images to generate next frame prediction. For example, MLR 532 may be configured as a generative adversarial network ("GAN") that includes a first NN (not depicted) configured to generate images, and a second NN (not depicted) configured to reject various generated images. In another example, MLR 532 may be configured as a retrospective cycle GAN to predict a next frame of a video stream. MLR 532 may be configured to perform reconstruction based on a single previous image or frame. MLR 532 may be configured to perform reconstruction based on a plurality (e.g., two, five, a dozen) of previous images. MLR 532 may be configured to perform reconstruction of a current image based on one or more previous images and a compressed or low-resolution version of the current image. In some embodiments, MLR 532 may be configured to perform multiple types of reconstruction operations. For example, MLR 532 may be configured to perform reconstruction of a current image based on a previous image and based on no current image data, such as a current image that has only null data or does not have any data. In another example, MLR 532 may also be configured to perform reconstruction of the current image based on a previous image and based on a small subset of current image data, such as a lower quality version of the current image. MLR 532 may be trained based on a plurality of video files (e.g., three, dozens, hundreds).

MLC 534 may be a neural network ("NN") or other relevant machine learning technique, such as an instance of network 400. MLC 534 may be a NN configured to perform one or more ML techniques to identify a reconstruction status of MLR 532. In detail, MLC 534 may be a NN configured to grade, rate, detect, or classify the performance of MLR 532. Unlike other reconstruction approaches, the VRSR 530 may leverage MLR 532 to detect or identify reconstructable images in a video without human intervention. For example, MLC 534 may be configured to determine whether each image of a video file is reconstructable by a machine learning technique configured to generate best guesses of missing image data. In another example, MLC 534 may be configured to determine whether each image produced by MLR 532 is reconstructable.

MLC 534 may be trained to identify a reconstruction status of based on reconstructed information from a machine learning technique and original information from an original video stream in a video file. In detail, MLC 534 may be configured as a classifier network, such as a placeholder classifier NN. MLC 534 may comprise an input layer that is configured to accept original information from a video file, such as an image or frame of video from a video stream. The original information may be an original image, such as an image that has no reconstructed portions or does not have any machine learning artifacts. In some embodiments, the original information may be a frame of a compressed image of the original video stream that is compressed using a lossy or lossless codec (e.g., an i-frame, a p-frame, a b-frame). Further, MLC 534 may also comprise an input layer that is also configured to accept reconstructed information, such as an image or frame that was reconstructed by MLR 532.

At least one hidden layer of MLC 534 may be configured to assist in determining if the quality of the reconstruction reaches a particular predefined threshold, such as a quality threshold. The quality threshold may be a predefined value that represents whether the quality of a reconstruction is acceptable. The quality threshold may indicate if the reconstructed image is free of—or does not include any—smudges, smears, blurs, noise, or other artifacts. The quality threshold may be tunable or adjustable by a user. For example, the quality threshold of MLC 534 may be ninety-nine percent similarity between a reconstructed image and an original image for a documentary genre. In another example, the quality threshold of MLC 534 may be eighty-two percent similarity between a reconstructed image and an original image for an animated movie genre.

An output layer of MLC 534 may be configured to assist in determining if a given reconstructed image is eligible to be utilized instead of an original image in a video file. The output layer of MLC 534 operate based on one or more NN techniques, such as a Softmax.

MLC 534 in one or more layers may operate based of a particular, score, equation or function, such as such as Equation 3.

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}} \quad \text{Equation 3}$$

MLC 534 may be trained based on the type or kind of machine learning operations that are to be performed. For example, MLC 534 may be trained based on multiple video files that are processed based on MLR 532 that is configured to perform a first ML technique, such as for reconstructing images of an animated video stream. If MLR 532 is reconfigured to perform a second ML technique—such as, for performing reconstruction of a sporting event video stream—MLC 534 may be retrained with many video files.

In operation, system 500 may reduce the size of video files that are captured before they are sent to various client devices 520. In detail, video file 540 may contain a video stream that is made of multiple images and/or frames, 540-1, 540-2, 540-3, 540-4, up to 540-n. The video file 540 may be located on client device 520-1. The video file 540 may be in an original format (e.g., an uncompressed video file, or a codec compressed video file). The video file 540 may be considered high quality, having no blurring, smudging, artifacts, or other blemishes from the perspective of a user.

VRSR 530 may generate an altered video file 570 from the video file 540. In detail, VRSR 530 may provide the video file 540 to the MLR 532. VRSR 530 may generate a working set of intermediate work elements 536-1, 536-2, 536-3, 536-4, up to 536-n (collectively, work elements 536). Each work element 536 may be populated by a given image

540 from the video stream, such as video image 540-1 for the first frame of video stream in video file 540-1. Each work element 536 may then be populated by reconstructed images 550 from MLR 532, such as MLR 532 creating a reconstruction 550-1 of video image 540-1, and MLR 532 creating a reconstruction 550-2 of video image 540-2, etc. Each work element 536 may then be populated with results 538-1, 538-2, 538-3, 538-4, up to 538-*n* (collectively, results 538) based on processing by MLC 534. The determination of each result 538, may indicate whether a given video image is reconstructable by a machine learning technique.

In a first example, VRSR 530 may place the third video image 540-2 into work element 536-2. Continuing the example, MLR 532 may generate a reconstruction 550-2 of video image 540-2 and place the reconstruction 550-2 into work element 536-2. Further continuing the example, MLC 534 may compare the reconstruction 550-2 to the video image 540-2 and may determine that video image 540-2 is not reconstructable as result 538-3.

In a second example, VRSR 530 may place the third video image 540-3 into work element 536-3. Continuing the second example, MLR 532 may generate a reconstruction 550-3 of video image 540-3 and place the reconstruction 550-3 into work element 536-3. Further continuing the second example, MLC 534 may compare the reconstruction 550-3 to the video image 540-3 and may identify that video image 540-3 is reconstructable as result 538-3.

The VRSR 530 may generate, based on performing the plurality of ML techniques, output that includes an altered video file 570. The altered video file 570 may include one or more original video images, such as video images 540-1 and 540-2 of original video file 540. The original video images 540-1 and 540-2 may be in altered video file 570 without any modification or adjustments from the original video file 540. For example, VRSR 530 may generate altered video file 570 without compressing video images 540-1 and 540-2 (e.g., video images 540-1 and 540-2 may be considered uncompressed or not compressed video images). The original video images 540-1 and 540-2 may be in altered video file 570 with reversible or unnoticeable modifications or adjustments, such as by a lossless compression algorithm.

The altered video file 570 may also include one or more placeholder elements 572, such as placeholder elements 572-3 and 572-4. The placeholder elements 572 may be compatible with one or more file standards. For example, the placeholder elements 572 may be of a minimum valid resolution or image compression technique that is compatible with a codec or other video compression algorithm. In another example, the placeholder elements 572 may be an image with a horizontal resolution of 1280 pixels and a vertical resolution of 720 pixels. The placeholder elements 572 may contain no actual image data. For example, the placeholder elements 572 may contain metadata that indicates VRSR 530 identified or flagged the given video image as reconstructable. In another example, the placeholder elements 572 may contain no data value or a null value.

The VRSR 530 may also generate additional metadata 574. The additional metadata 574 may include instructions on the manner of reconstructing the placeholder elements 572. For example, the additional metadata 574 may indicate whether a given placeholder element 572 should be reconstructed based on a single previous image of the video stream. In another example, the additional metadata 574 may indicate whether a given placeholder element 572 should be reconstructed, based on a plurality of images in the video stream. In yet another example, the additional metadata 574 may indicate whether a given placeholder element 572 should be reconstructed, based on a previous image and a compressed version of the image located in the given placeholder element 572.

The additional metadata 574 may include information that describes the type of images, frames, or other relevant video stream data. For example, the additional metadata 574 may include a table with key-value pairs that include an identifier that indicates or references a given placeholder element 572 and descriptive values that describe other information about the given placeholder element 572. For example, a particular placeholder element 572-4 may have originally been an I-frame in video file 540. The additional metadata 574 may include a value "572-4" and another value "I-frame, codec standard 47231.232, 10-bit color" for information used by reconstruction techniques to reconstruct the original video stream image 540-4.

The VRSR 530 may generate one or more distributable files for each video file that includes one or more components necessary to reconstruct the video files. For example, based on video file 540, VRSR 530 may generate distributable 580 that includes the following: an altered video file 570, additional metadata 574, and a copy of MLR 532. VRSR 530 may provide altered video file 570, additional metadata 574, MLR 532, and/or distributable 580 to network 510 for hosting to clients 520.

Further, FIG. 5B depicts an example of system 500 configured to reconstruct a selectively compressed video file based on reconstruction techniques, consistent with some embodiments of the disclosure.

In some embodiments, an altered video file 570 may be provided to one or more client devices, such as client device 520-2. A machine learning technique, such as MLR 532, may also be provided to one or more client devices. The altered video vile 570 may be provided as part of a distributable, such as distributable 580, that includes other items including additional metadata 574, and MLR 532. The client device 520-2 may reconstruct a copy 590 of the original video file 540. The client device 520-2 may reconstruct the copy 590 based on receiving an instruction. For example, the VRSR 530 may cause a client device, such as client device 520-2, to reconstruct a copy 590 by providing one or more instruction (not depicted) to the client device.

In some embodiments, an altered video file 570 may be actively downloaded and reconstructed by a client device. For example, client device 520-2 may connect to network 510 to browse one or more video files from an ISP, such as a movie rental service. Client device 520-2 may select a video stream that is in video file 540, e.g., a nature documentary. In response to selecting the video stream, another client device (e.g., an ISP server) may provide the altered video file 570 instead of the original video file 540. The client device may, in response to detecting that the video file is an altered video, retrieve a machine learning technique that can be used to reconstruct the original video file 540. Client device 520-2 may detect that a downloaded video file is an altered video file 570 by scanning the altered video file for placeholders. The placeholders may be identified by detecting metadata that indicates one or more images are placeholders. Client device 520-2 may detect that a downloaded video file is an altered video file 570 by scanning the altered video file for irregularities in one or more images that indicate a particular image is a placeholder. For example, an indication that particular image is a placeholder may be identified by a video image that includes any of the following: no data, a null value, a video image that is half the size of other video images, a video image that is one quarter the size of other video images, etc.

Responsive to detection of the altered video, client device 520-2 may communicate to other client devices 520 on network 510 a request. The request may be for a machine learning technique, such as MLR 532. The client device 520-2 may retrieve the machine learning technique from another client device 520, such as an ISP server (not depicted). The client device 520-2 may retrieve the machine learning technique from a received package or distributable, such as decrypting or decompressing distributable 580 to retrieve MLR 532.

Client device 520-2 may generate a copy 590 of a video file by using a retrieved machine learning technique on the altered video file 570. Specifically, client device 520-2 may process each of the placeholder images, e.g., placeholder images 572-3 and 572-4, to generate a copy 590 of the original video stream that was in the video file 540.

Figure 6:
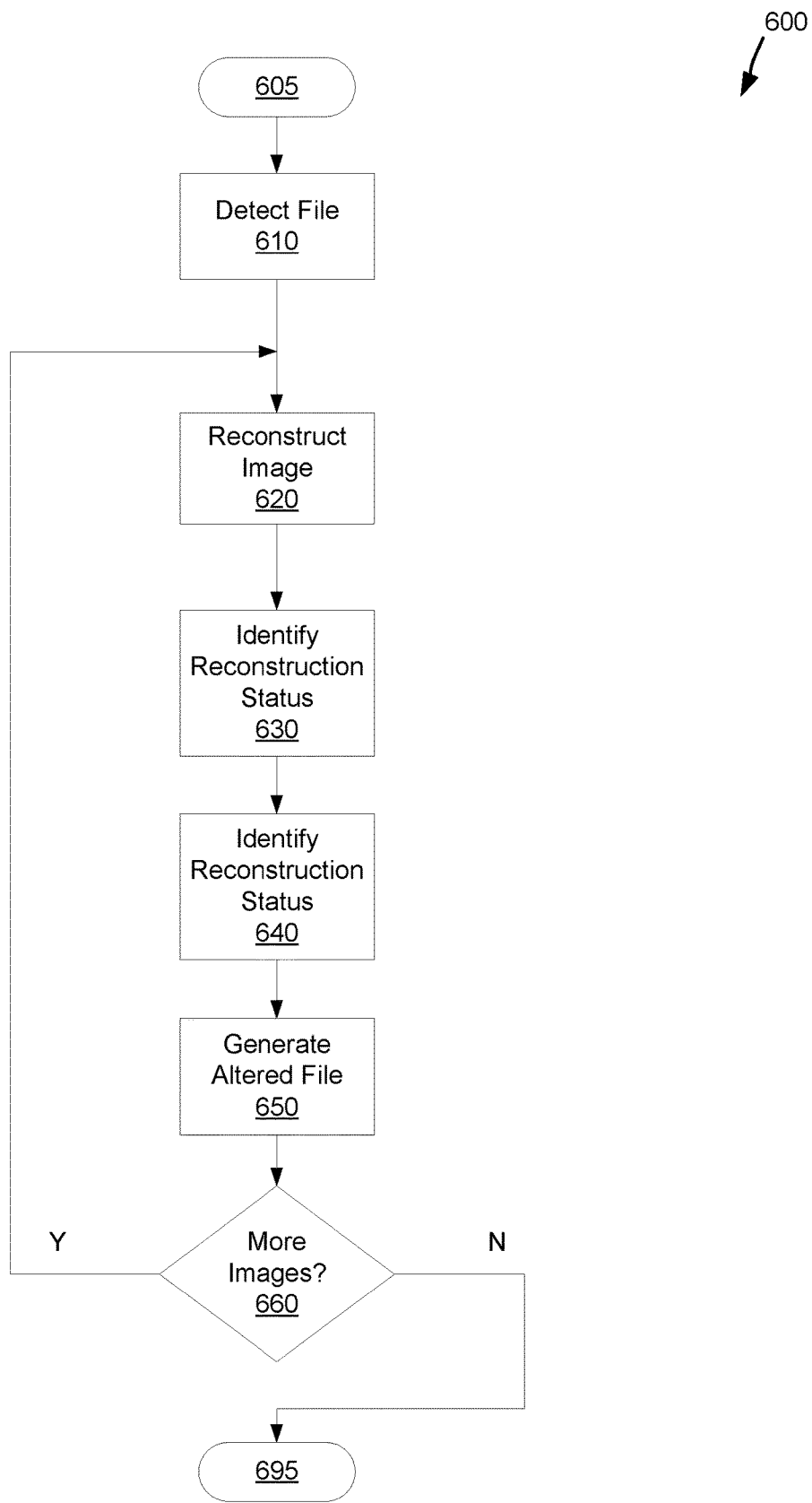
FIG. 6 depicts an example method of reducing video file size, consistent with some embodiments of the disclosure.

FIG. 6 depicts an example method of reducing video file size, consistent with some embodiments of the disclosure. Method 600 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). Method 600 may be performed by a VRSR, such as VRSR 530.

From start 605, a video file may be detected at 610. The video file may be detected by a computer system, such as a server of an ISP or a client device that generated the video. The video may be intended to be provided to a plurality of client devices. For example, the video may be being sent by a first client device to a second over a network. The video file may contain a video stream that includes a plurality of video images.

At 620, a video image of the plurality may be reconstructed. For example, a first video image of the plurality may be reconstructed in a first iteration of operation 620 and a second video image of the plurality may be reconstructed in a second iteration of operation 620. The video image may be reconstructed, based on a first machine learning technique. The first machine learning technique may operate based on input from on one or more video images that occur temporally before the first video image in the video stream.

At 630, a reconstruction status of the video image may be identified based on the video file. The identification may take place based on a second machine learning technique. For example, the second machine learning technique may operate as a classifier NN configured to identify the accuracy of the first machine learning technique.

At 640, an altered video file may be generated in response to the reconstruction status. The altered video file may be generated based on the video file that was detected, at 610. The reconstruction status may indicate that a video image is greater or lesser than a quality threshold. The generation of the altered video may be different based on the reconstruction status. For example, the altered video file may be generated by inserting metadata that indicates the quality of the reconstruction is less than the threshold, if the reconstruction status is that the quality is less than the threshold determined by the second machine learning technique. In another example, the altered video file may be generated by inserting placeholder data if the quality of the reconstruction is indicated as greater than the threshold.

If there are additional video images in the original video file, at 660:Y, method 600 may continue by again performing a reconstruction of a video image, at 620. If there are no additional video images in the original video file, at 660:N, method 600 may end at 695.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting, by a computer system, a video file that is to be provided to one or more client devices, the video file containing a video stream that includes a plurality of video images;
   reconstructing, based on a first machine learning technique, a first video image of the plurality of video images, the first machine learning technique being next-frame prediction that is based on one or more video images that occur solely temporally before the first video image in the video stream;
   identifying, based on the video file and based on a second machine learning technique, a reconstruction status of the first video image of the plurality of video images; and
   generating, in response to the reconstruction status and based on the video file, an altered video file.

2. The method of claim 1, wherein the method further comprises:
   providing the altered video file to a first client device;
   providing the first machine learning technique to the first client device;
   causing the first client device to reconstruct, based on the first machine learning technique, the video file from the altered video file.

3. The method of claim 2, wherein the second machine learning technique is a classifier neural network.

4. The method of claim 1, wherein the first machine learning technique is a generative adversarial network.

5. The method of claim 1, wherein:
   the reconstruction status is that a reconstruction of the first video image of the plurality of video images is less than a quality threshold, and
   the first video image is located in a first position in the video file.

6. The method of claim 5, wherein the generating the altered video file comprises:
   generating reconstruction metadata that indicates the reconstructions status of the first video image is less than the quality threshold; and
   tagging the first video image with the reconstruction metadata.

7. The method of claim 5, wherein the generating the altered video file comprises:
generating, based on a lossless compression technique, a placeholder video image for the first video image;
removing the first video image from the video file; and
inserting the placeholder video image into the first position in the video file.

8. The method of claim 5, wherein the method further comprises:
generating, based on a compression technique and from the first video image, a compressed first video image;
reconstructing, based on a first machine learning technique and based on the compressed first video image, the first video image of the plurality of video images;
identifying, based on the video file and based on a second machine learning technique, a second reconstruction status of the first video image of the plurality of video images.

9. The method of claim 1, wherein:
the reconstruction status is that a reconstruction of a first video image of the plurality of video images is greater than a first quality threshold,
the first video image is located in a first position in the video file, and
the generating the altered video file comprises:
generating a placeholder video image for the first video image;
removing the first video image from the video file; and
inserting the placeholder video image into the first position in the video file.

10. The method of claim 9, wherein the placeholder video image is generated based on a compression technique.

11. The method of claim 9, wherein the placeholder video image includes reconstruction metadata that indicates the reconstructions status of the first video image is greater than the first quality threshold.

12. The method of claim 11, wherein the placeholder video image does not contain any image data.

13. The method of claim 1, wherein the first video image is a video frame compressed with an intraframe compression technique.

14. The method of claim 1, wherein the first video image is a video frame compressed with an interframe compression technique.

15. The method of claim 1, wherein the method further comprises:
compressing, based on a file compression technique, the altered video file.

16. A system, the system comprising:
a memory, the memory containing one or more instructions; and
a processor, the processor communicatively coupled to the memory, the processor, in response to reading the one or more instructions, configured to:
detect, by a computer system, a video file that is to be provided to a plurality of client devices, the video file containing a video stream that includes a plurality of video images;
reconstruct, based on a first machine learning technique, a first video image of the plurality of video images, the first machine learning technique being next-frame prediction that is based on one or more video images that occur solely temporally before the first video image in the video stream;
identify, based on the video file and based on a second machine learning technique, a reconstruction status of the first video image of the plurality of video images; and
generate, in response to the reconstruction status and based on the video file, an altered video file.

17. A computer program product, the computer program product comprising:
one or more computer readable storage media, wherein the computer readable storage medium is not a transitory signal per se; and
program instructions collectively stored on the one or more computer readable storage media, the program instructions configured to:
detect, by a client device, an altered video file to be played by the client device;
retrieve, in response to the altered video file, a first machine learning technique being next-frame prediction; and
generate, based on the first machine learning technique, a video file from the altered video file, the video file containing a video stream that includes a plurality of video images;
wherein the first machine learning technique is based on one or more video images that occur solely temporally before a first video image in the video stream.

18. The computer program product of claim 17, wherein the detecting the altered video comprises:
scanning the altered video file for metadata that describes the altered video file; and
identifying, based on the scanning, reconstruction metadata that indicates a reconstruction status of the first video image in the plurality of video images.

19. The computer program product of claim 18, wherein the generating the video file comprises:
reconstructing, based on the first machine learning technique, the first video image from one or more previous video images that occur just before the first video image in the video stream.

20. The computer program product of claim 19, wherein the first video image is a lossy compressed image, and the reconstructing is also based on the lossy compressed image.

* * * * *